Nov. 13, 1934.  J. MESICK  1,980,422
PLOTTING BOARD
Filed Sept. 30, 1931  2 Sheets-Sheet 1
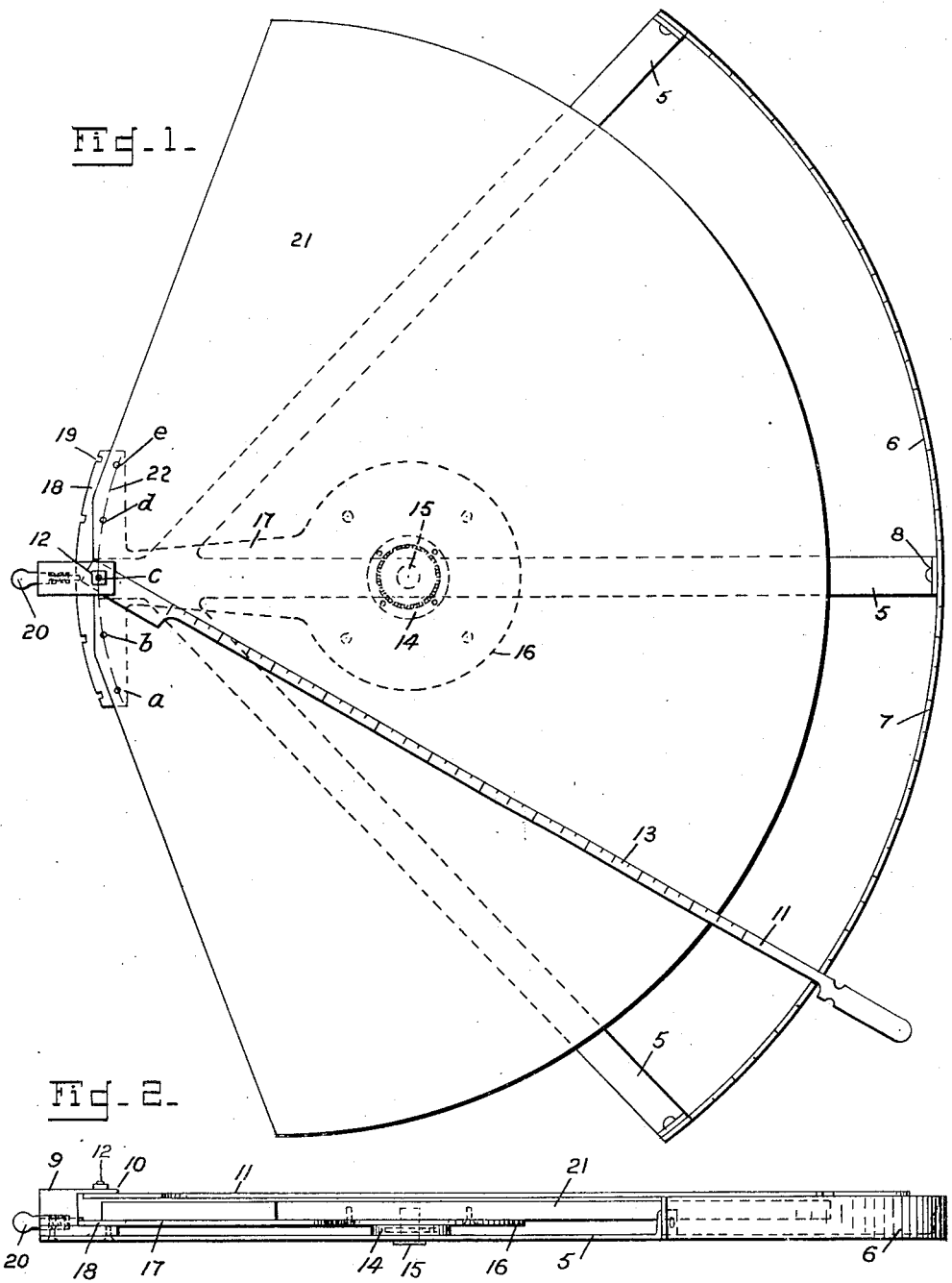
INVENTOR.
John Mesick
BY W. N. Roach
ATTORNEY Nov. 13, 1934.   J. MESICK   1,980,422

PLOTTING BOARD

Filed Sept. 30, 1931   2 Sheets-Sheet 2

INVENTOR.
John Mesick
BY W. N. Roach
ATTORNEY

Patented Nov. 13, 1934

1,980,422

UNITED STATES PATENT OFFICE 1,980,422

PLOTTING BOARD

John Mesick, United States Army, Fort Stotsenberg, P. I.

Application September 30, 1931, Serial No. 566,133

5 Claims. (Cl. 33—76)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a plotting board especially designed for terrestrial sound ranging to determine the position of enemy guns.

When a gun is fired it produces a disturbance in the air which travels outward uniformly in all directions with a circular wave front. The data required for locating the position of the gun are the accurate differences in time of arrival of a sound wave at known points. One method of determining the data consists, briefly, in placing at fixed distances on the arc of a circle a series of stations for directing and recording the pressure characteristics of the sound wave and also for simultaneously entering an accurate time record on the sound record. By taking the stations in pairs and finding the time interval for each pair, a series of hyperbolæ may be drawn, one for each pair, corresponding to the time interval for that pair. The gun which is the source of sound, will lie at the intersection of the hyperbolæ.

The present invention relates to a plotting device for rapidly and accurately applying the data obtained at the recording stations. The device is characterized by a base having a time scale and reading arm and pivotally mounting a drawing board on which the sub-bases between the recording stations are represented.

To these and other ends, the invention consists in the construction, arrangement and combination of elements described hereinafter and pointed out in the claims forming a part of this specification.

A practical embodiment of the invention is illustrated in the accompanying drawings, wherein:

Fig. 1 is a plan view of a plotting board constructed in accordance with the invention.

Fig. 2 is a view in side elevation thereof.

Figure 3:
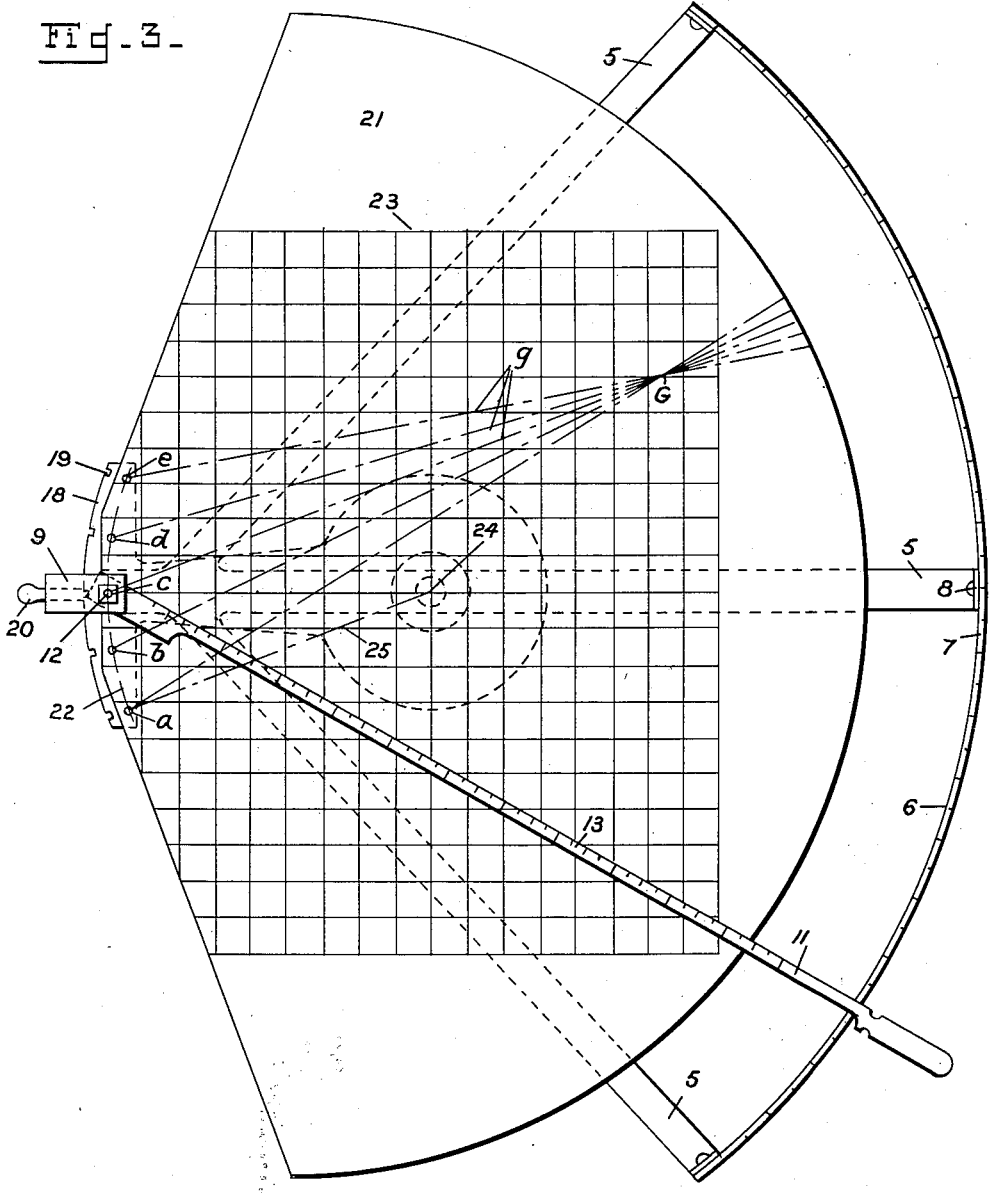
Fig. 3 is a plan view with a sheet of plotting paper on the board and illustrating the method of plotting the origin of sound.

Referring to the drawings by characters of reference:

The device comprises a base, preferably segmental in shape and formed of spaced radial bars 5—5—5 connected at their outer ends by an arcuate member 6. The arcuate member carries a scale 7 graduated in 1/100 seconds time intervals and extending on either side of a zero index 8.

The intermediate bar 5 is extended at the joint of the bars and supports a block 9 having a projecting finger 10 on which a reading arm 11 is secured by a pivot pin 12. The reading arm extends over the scale and rests thereon. It is provided with a range scale 13 and is to be used in taking readings for correction purposes.

The intermediate bar 5 is provided at a more or less central point with an anti-friction bearing 14 for mounting the pivot pin 15 of a carrier 16. The carrier includes an arm 17 terminating in a segmental plate 18 resting on and movable over the block 9. The edge of the plate 18 forms the arc whose center is the pivot 15 of the carrier and is provided with spaced recesses 19 for receiving a plunger 20 mounted in the block 9. A drawing board 21 is secured to the carrier.

In actual practice it is customary to employ six recording stations placed a fixed distance apart on a base of from 7000 to 8000 yards. The stations are located on the arc of a circle whose center lies within the enemy lines in proximity to the artillery concentrations. The stations are located by survey. In the plotting board the pivot 15 of the carrier and drawing board represents the center of the arc on which the recording stations are located. This arc is represented on the plotting board and is designated by the arcuate line 22. The mid-points of the sub-bases between recording stations are represented on the arc 22 by circles $a$, $b$, $c$, $d$, and $e$. The recesses 19 in the edge of the plate 18 of the carrier correspond to the mid-points. By withdrawing the plunger the carriage and drawing board may be rotated about the pivot 15 in order to selectively align the mid-points $a$, $b$, $c$, $d$, and $e$ with the pivot 12 of the reading arm 11.

Referring to Fig. 3, a sheet of plotting or grid paper 23 is employed in conjunction with the device. From the computation of the survey data, the map coordinates of the center of the arc of recording stations are known. This point 24 corresponding to the arc center and a point corresponding to the position of one of the mid-points, (the mid-point $a$) are plotted on the grid sheet and connected by the line 25. The reading arm is placed in its zero position passing over the pivot 15 and the drawing board is adjusted until the plunger engages in the recess 19 corresponding to the selected mid-point ($a$).

The grid sheet is then oriented, the line 25 being positioned along the edge of the reading arm and the point 24 corresponding to the arc center being aligned with the center of the pivot 15.

The grid sheet is then secured in place and the device is ready to plot data.

The time intervals having been determined at each recording station and combined in pairs to obtain a value applicable to the mid-points $a$, $b$, $c$, $d$, and $e$, the plotter successively moves the drawing board so that the mid-points are in alignment with the pivot 12 of the reading arm. At each position the reading arm is adjusted to indicate the appropriate time interval on the scale 7, and a line $g$ is drawn on the grid sheet corresponding to the edge of the reading arm. The intersection G of the lines thus drawn from the mid-points $a$, $b$, $c$, $d$, and $e$, indicates the position of the gun or source of sound.

The intersecting lines $g$ are asymptotes of the hyperbola on which the gun lies. Where the distance of the gun is greater than five times the base length the asymptote is sufficiently close to the true hyperbola to be accepted but where the distance is relatively short, a correction is applied.

While the principle of the device is illustrated and described as applicable to a particular arc radius and base length it is to be understood that parts may be made adjustable or may be replaced to provide for operation when these dimensions are varied.

I claim:

1. A plotting device for sound ranging embodying a base, a time interval scale on the base, a board pivotally mounted on the base, means on the board representing a base line, means on the base line representing mid-points between recording stations, a reading arm pivoted on the base to overlie the board and readable against the time interval scale, the pivot of the arm being in alignment with the base line and also being in line with the pivot of the board and the zero of the time interval scale, and means for securing the board in pivoted adjustment relative to the base to align between the mid-points of the base line and the pivot of the reading arm.

2. A plotting device for sound ranging embodying a base, a time interval scale on the base, a board pivotally mounted on the base, means on the board representing a base line, means on the base line representing mid-points between recording stations on the base line, and a reading arm pivoted on the base to overlie the board and readable against the time interval scale, the pivot of the arm being in alignment with the base line and also being in line with the pivot of the board and the zero of the time interval scale.

3. A plotting device for sound ranging embodying a support, a time interval scale on the support, a plotting board pivotally mounted on the support, a reading arm pivotally mounted on the support to overlie the plotting board and readable against the time interval scale, the pivot of the arm being in line with the pivot of the board and the zero of the time interval scale, and means for holding the board in positions of angular adjustment relative to the support.

4. A plotting device for sound ranging embodying a support, a time interval scale on the support, a plotting board pivotally mounted on the support, and a reading arm pivotally mounted on the support to overlie the plotting board and readable against the time interval scale, the pivot of the arm being in line with the pivot of the board and the zero of the time interval scale.

5. A predicting device for sound ranging embodying a support, a time interval scale on the support, an arm pivotally mounted on the support and readable against the time interval scale, and a plotting board pivotally mounted on the support with its pivot between the pivot of the arm and the zero of the time interval scale, said plotting board having means representing recording stations and positioned to be brought into registration with the pivot of the reading arm upon rotation of the plotting board.

JOHN MESICK.